J. DAFT.
LIGHTING DEVICE.
APPLICATION FILED OCT. 29, 1912.
1,063,187.
Patented June 3, 1913.
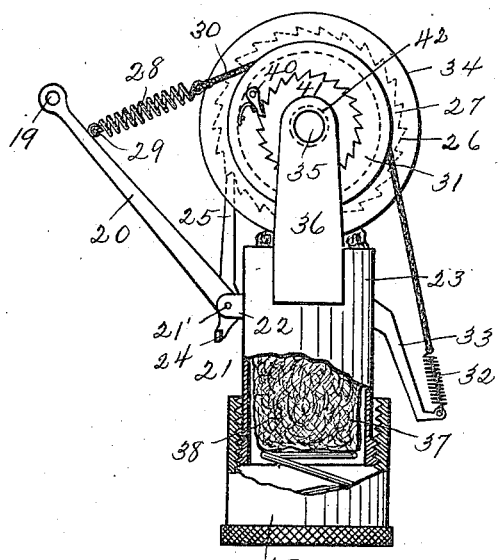
Fig. 1.
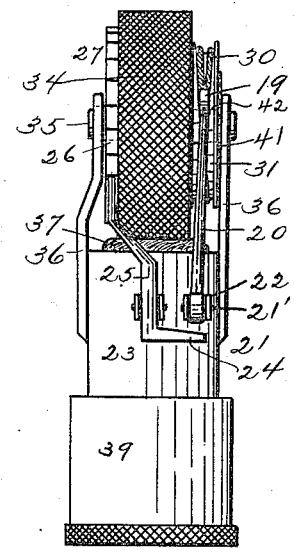
Fig. 2.
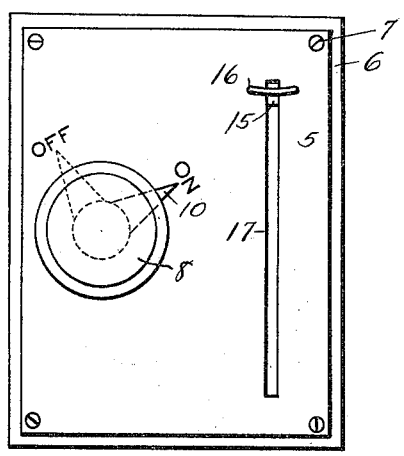
Fig. 3.
Fig. 4.
WITNESSES
M. Lyles.
F. G. Campbell
Joseph Daft
INVENTOR
BY Samuel Herrick
ATTORNEY

UNITED STATES PATENT OFFICE.

JOSEPH DAFT, OF EDEN VALE, CALIFORNIA.

LIGHTING DEVICE.

1,063,187. Specification of Letters Patent. Patented June 3, 1913.

Application filed October 29, 1912. Serial No. 728,523.

*To all whom it may concern:*

Be it known that I, JOSEPH DAFT, a citizen of the United States, residing at Eden Vale, in the county of Santa Clara and State of California, have invented certain new and useful Improvements in Lighting Devices, of which the following is a specification.

This invention relates to lighting devices and has for its object the provision of a device of this character particularly adapted for use in lighting the gas lamps of an automobile from the dash, though it is to be understood that the invention is not limited to this use, but that it may be employed in any relation where the sparks from a piece of pyrophoric material may be advantageously employed.

The present invention particularly contemplates the location of a controlling valve for the gas lamps upon the dash, and the location adjacent said controlling valve of an operating lever for a roughened or knurled wheel together with means for imparting a quick movement to said wheel, the latter engaging a piece of pyrophoric material, and so located with relation to the lamps of the automobile that the sparks from the said material will serve to ignite the gas at the burners of said lamps.

Further objects and advantages of the invention will be set forth in the detailed description which now follows.

In the accompanying drawing Figure 1 is a view in side elevation with certain of the parts broken away, of a lighting element constructed in accordance with the invention. Fig. 2 is an edge elevation thereof. Fig. 3 is a view of a dash plate hereinafter described, and Fig. 4 is a side view of the controlling valve and the casing in which said controlling valve and the controlling member for the lighter are located.

Like numerals designate corresponding parts in all of the figures of the drawing.

Referring to the drawing, the numeral 5 designates a plate which is secured to the dash 6 by screws or like fastening devices 7. A knob 8, of a pet cock 9 is provided with a pointer 10 and upon the face of the plate the words "on" and "off" are imprinted, or otherwise formed to indicate whether the gas is turned on or off. A tube 11 leads from the source of gas supply, which may be an acetylene gas tank or other gas tank and a tube 12 leads to the lamp to be lighted, which is not shown. Pivoted at 13 within a casing 14 is an operating lever 15 having a finger 16 projecting through slot 17 formed in plate 5. A cord 18 is fastened to operating lever 15 and the opposite end of this cord is secured to an eyelet 19 formed in the outer end of an operating lever 20 of the lighter 21, it being understood that this lighter is located within the lamp and adjacent the burner. The cord 18 may be of any length and extend any distance. The operating lever 20 is pivoted at 21′ to an ear 22 of a casing 23 and as this operating lever is drawn downwardly by the pull of cord 18 it contacts with a lug 24 carried by the tail end of pawl 25. This pawl normally engages teeth 26 of a ratchet wheel 27. A spring 28 is connected at 29 to the lever 20 and the opposite end of this spring is connected to a cord 30 which passes around the drum 31 and is then attached to a spring 32, said spring in turn being connected to a bracket 33. The ratchet 27 is fixed to or carried by a knurled or roughened wheel 34. It is mounted upon a shaft 35 supported in bearings 36 extending from casing 23. Located within the casing 23 is a piece of pyrophoric material 37. A spring 38 bears against the under side of this material and holds the upper end thereof into engagement with the knurled wheel 34. A cap 39 is threaded upon the lower end of the casing 23 and may be turned to adjust the tension of the spring 38 and to take up any wear of the material 37. The drum 31 carries a pawl 40 which engages with a ratchet wheel 41 carried by a sleeve indicated at 42, this sleeve being mounted upon shaft 35, and said sleeve being formed with the knurled wheel 34.

The operation of the device is as follows. When the lever 20 is drawn downwardly, the pull upon the cord 30 tends to rotate the drum 31 and consequently to rotate the knurled wheel through the medium of pawl 40, ratchet wheel 41 and sleeve 42, but such rotation of the knurled wheel is prevented by the pawl 25 engaging the teeth of ratchet 27 until lever 20 strikes lug 24 and releases said pawl. By this time spring 28 has been put under considerable tension and a quick spin is given the knurled wheel when the pawl 25 is moved to release ratchet 27. Spring 28, which is a comparatively heavy one, at this time distends spring 31, which is a comparatively light one, so that when the operating lever is released spring 31 will serve to return the parts to the position illustrated in Fig. 1. It will, therefore, be seen that the knurled wheel rotates always in one direction, while the drum has a back and forth movement. The rotation of the knurled wheel always in the same direction results in always throwing the sparks in the proper direction or toward the burner, not shown.

While the elements shown and described are well adapted to serve the purposes for which they are intended, it is to be understood that the invention is not limited to the precise construction set forth, but includes within its purview, such changes as may be made within the scope of the appended claims.

Having described my invention, what I claim is:—

1. In a device of the character described, the combination with a pyrophoric material, of a rotative member supported in operative relation thereto, an oscillatory member, an operating member, a yielding member between said operating member and said oscillatory member, means for connecting said oscillatory member to said rotative member and means for holding said rotative member against movement during initial movement of the operating member and for then releasing said rotative member.

2. In a device of the character described, the combination with a pyrophoric material, of a rotative member supported in operative relation thereto, an oscillatory member, an operating member, a yielding member between said operating member and said oscillatory member, means for connecting said oscillatory member to said rotative member, means for holding said rotative member against movement during initial movement of the operating member and for then releasing said rotative member, and spring means connected to said oscillatory member for returning the parts to normal position.

3. In a device of the character described the combination with a pyrophoric material, of a rotative member supported in operative relation thereto, an oscillatory member, an operating member, a yielding member between said operating member and said oscillatory member, means for connecting said oscillatory member to said rotative member, means for holding said rotative member against movement during initial movement of the operating member and for then releasing said rotative member and means for advancing said material toward said wheel.

4. In a device of the character described, the combination with a pyrophoric material supporting casing, of a roughened wheel supported in operative relation thereon, a ratchet wheel carried by said roughened wheel, a pawl engaging said ratchet wheel, an operating lever having a lost motion engagement with said pawl, a drum, a flexible member passing over said drum, a spring interposed between said flexible member and said operating member and a pawl and ratchet connection between said drum and said roughened wheel.

5. In a device of the character described, the combination with a pyrophoric material supporting casing, of a roughened wheel supported in operative relation thereon, a ratchet wheel carried by said roughened wheel, a pawl engaging said ratchet wheel, an operating lever having a lost motion engagement with said pawl, a drum, a flexible member passing over said drum, a spring interposed between said flexible member and said operating member, a pawl and ratchet connection between said drum and said roughened wheel, and a fixed spring to which the opposite end of said flexible member is connected.

In testimony whereof I have affixed my signature in the presence of two witnesses.

JOSEPH DAFT.

Witnesses:
WILLIAM L. FISCHER,
GEO. C. WILSON.

---

Copies of this patent may be obtained for five cents each, by addressing the "Commissioner of Patents, Washington, D. C."